(12) United States Patent
Holzapfel et al.

(10) Patent No.: US 9,464,652 B2
(45) Date of Patent: Oct. 11, 2016

(54) FASTENING DEVICE FOR FASTENING A FRONT PANEL ON A DRAWER

(71) Applicant: Julius Blum GmbH, Hochst (AT)

(72) Inventors: Andreas Holzapfel, Bregenz (AT); Benjamin Hoffmann, Dornbirn (AT)

(73) Assignee: JULIUS BLUM GMBH, Hochst (AT)

( * ) Notice: Subject to any disclaimer, the term of this patent is extended or adjusted under 35 U.S.C. 154(b) by 364 days.

(21) Appl. No.: 14/077,283

(22) Filed: Nov. 12, 2013

(65) Prior Publication Data

US 2014/0072366 A1 Mar. 13, 2014

Related U.S. Application Data

(63) Continuation of application No. PCT/AT2012/000141, filed on May 22, 2012.

(30) Foreign Application Priority Data

May 24, 2011 (AT) .................. A 751/2011

(51) Int. Cl.
*F16B 12/02* (2006.01)
*A47B 88/00* (2006.01)

(52) U.S. Cl.
CPC ........... *F16B 12/02* (2013.01); *A47B 88/0051* (2013.01); *A47B 88/0055* (2013.01); *A47B 2088/007* (2013.01); *A47B 2088/0059* (2013.01); *Y10T 403/60* (2015.01)

(58) Field of Classification Search
CPC .......... A47B 88/0055; A47B 88/0051; A47B 2088/007; A47B 2088/0074; A47B 2088/0059; A47B 2088/0062; A47B 2088/0069; Y10T 292/702; Y10T 403/595; Y10T 403/598; Y10T 403/599; Y10T 403/60; Y10T 403/602; Y10T 403/608; F16B 12/00; F16B 12/02

See application file for complete search history.

(56) References Cited

U.S. PATENT DOCUMENTS 5,181,772 A 1/1993 Albiez
5,364,181 A 11/1994 Scheible
(Continued)

FOREIGN PATENT DOCUMENTS

AT EP 0722680 A2 * 7/1996 ......... A47B 88/0014
AT EP 0740917 A1 * 11/1996 ......... A47B 88/0051
(Continued)

OTHER PUBLICATIONS

International Search Report (ISR) issued Nov. 7, 2012 in International (PCT) Application No. PCT/AT2012/000141.
(Continued)

*Primary Examiner* — Jonathan Masinick
(74) *Attorney, Agent, or Firm* — Wenderoth, Lind & Ponack, L.L.P.

(57) ABSTRACT

A fastening device includes at least one furniture fitting which is pre-assembled on the front panel and has a first connecting element and a second connecting element for fastening the front panel on the drawer and least two intercepting devices, which are assigned to the drawer, wherein the intercepting devices retain the connecting elements automatically when the latter are pushed in. The one intercepting device has at least one movable intercepting element and the second intercepting device has at least one movable retaining Element. At least one locking device for the two intercepting devices prevents the furniture fitting from being released unintentionally from the intercepting devices. At least one unlocking device the two connecting elements of the furniture fitting to be released together from the intercepting devices. The retaining element can be moved independently of the intercepting element of the first intercepting device.

17 Claims, 18 Drawing Sheets

(56) References Cited

U.S. PATENT DOCUMENTS

| | | | |
|---|---|---|---|
| 5,540,515 A | 7/1996 | Rock et al. | |
| 5,860,718 A * | 1/1999 | Brustle | A47B 88/0051 312/330.1 |
| 6,457,791 B1 | 10/2002 | Muterthies et al. | |
| 2007/0228906 A1 * | 10/2007 | Netzer | A47B 88/0055 312/348.4 |
| 2009/0113673 A1 * | 5/2009 | Weber | A47B 88/0051 24/1 |
| 2010/0102692 A1 | 4/2010 | Hammerle | |

FOREIGN PATENT DOCUMENTS

| | | | |
|---|---|---|---|
| AT | WO 2007137311 A2 * | 12/2007 | ......... A47B 88/0055 |
| CH | EP 1716778 A1 * | 11/2006 | ......... A47B 88/0051 |
| CN | 101181116 | 5/2008 | |
| CN | 101969810 | 2/2011 | |
| DE | 94 19 610 | 3/1995 | |
| DE | 298 09 494 | 10/1999 | |
| DE | 20 2009 014 8 | 3/2010 | |
| DE | 202014002229 U1 * | 4/2014 | ......... A47B 88/0055 |
| EP | 1 151 697 | 11/2001 | |
| EP | 1 157 636 | 11/2001 | |
| EP | 1 161 898 | 12/2001 | |
| EP | 2 238 864 | 10/2010 | |
| JP | 4-253809 | 9/1992 | |
| WO | 2007/137311 | 12/2007 | |
| WO | 2009/006651 | 1/2009 | |
| WO | 2010/136228 | 12/2010 | |

OTHER PUBLICATIONS

Austrian Patent Office Search Report (ASR) issued Feb. 21, 2012 in Austrian Patent Office No. A 751/2011.
Chinese Search Report (SR) issued Jan. 30, 2015 in parallel Chinese Patent Application No. 201280024863.1.
Japanese Office Action (OA) issued Jun. 2, 2015 in parallel Japanese Patent Application No. 2014-511684, together with partial English translation.

* cited by examiner

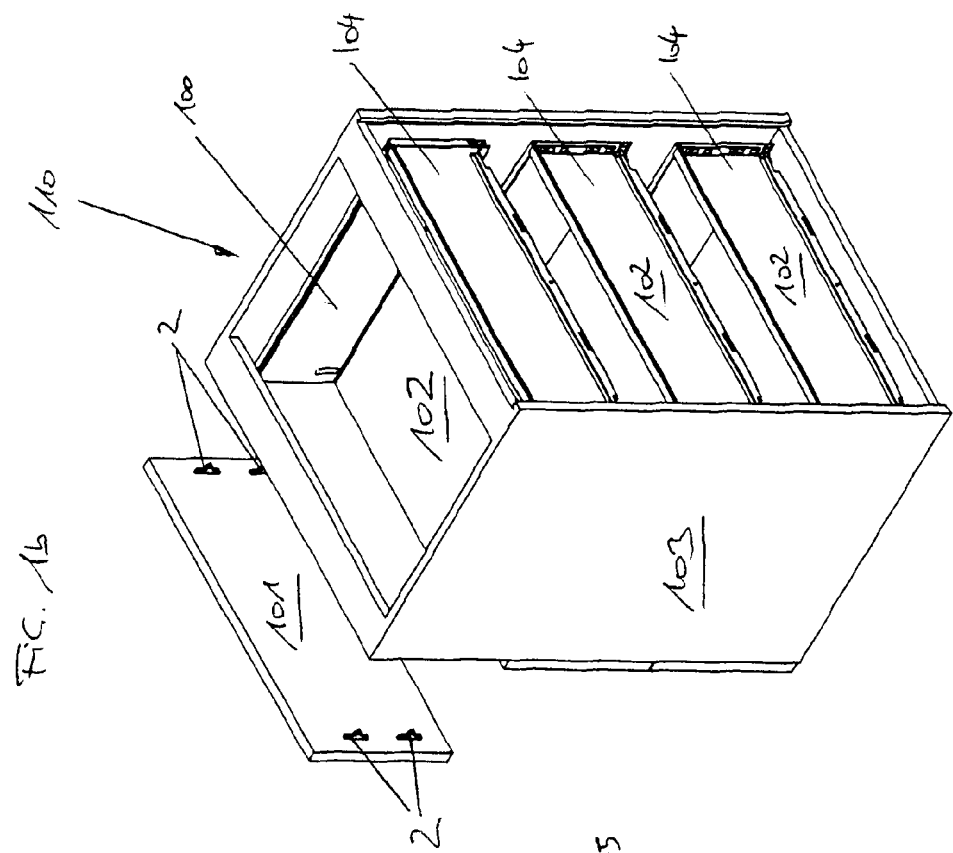
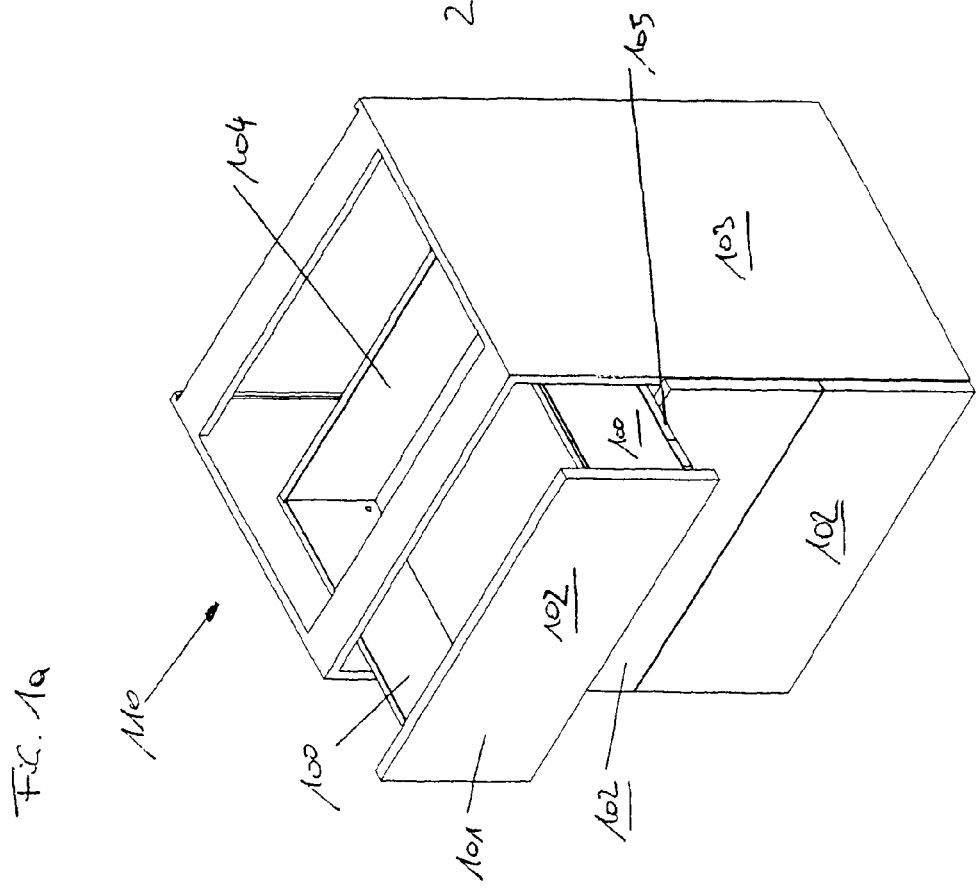

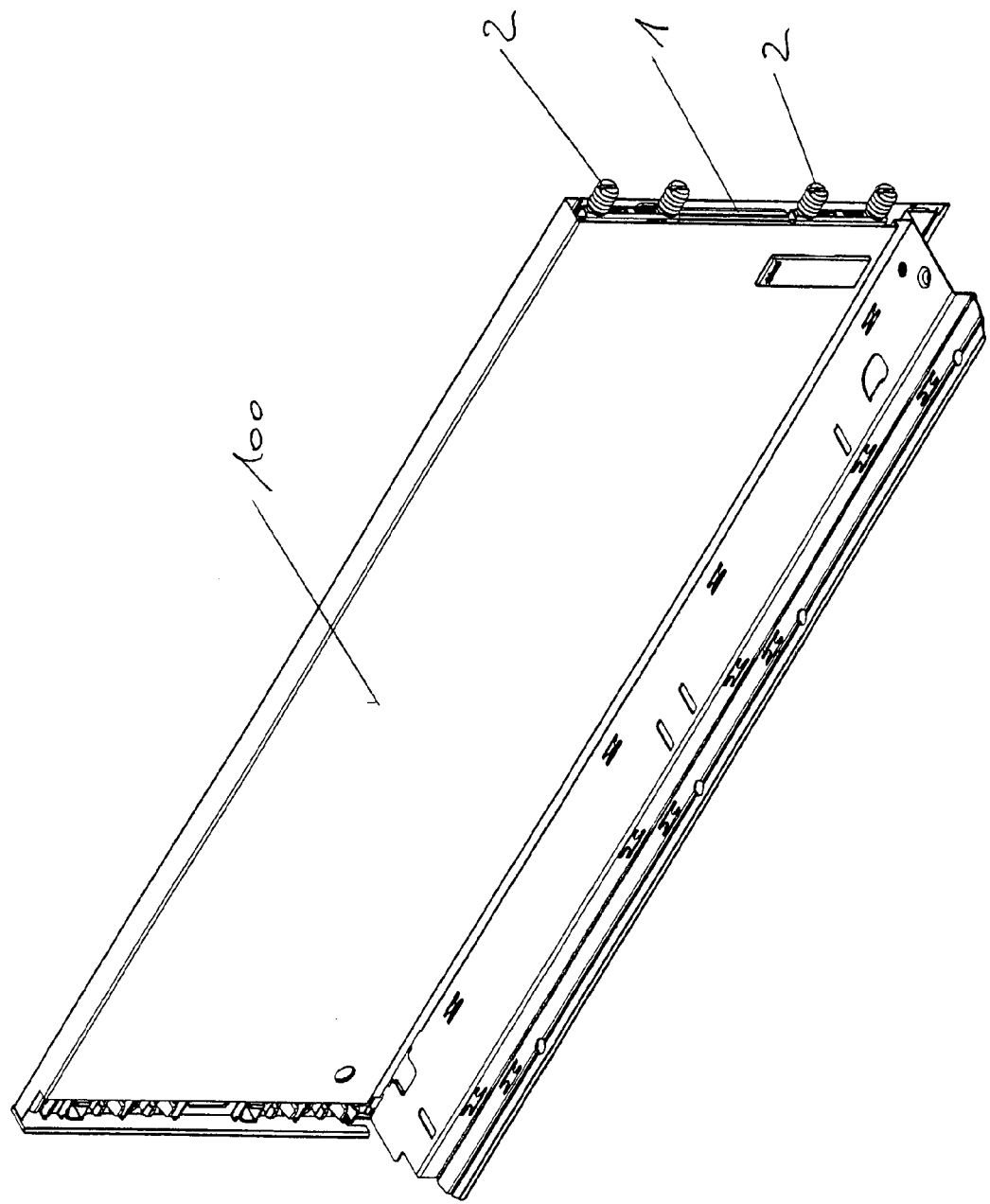

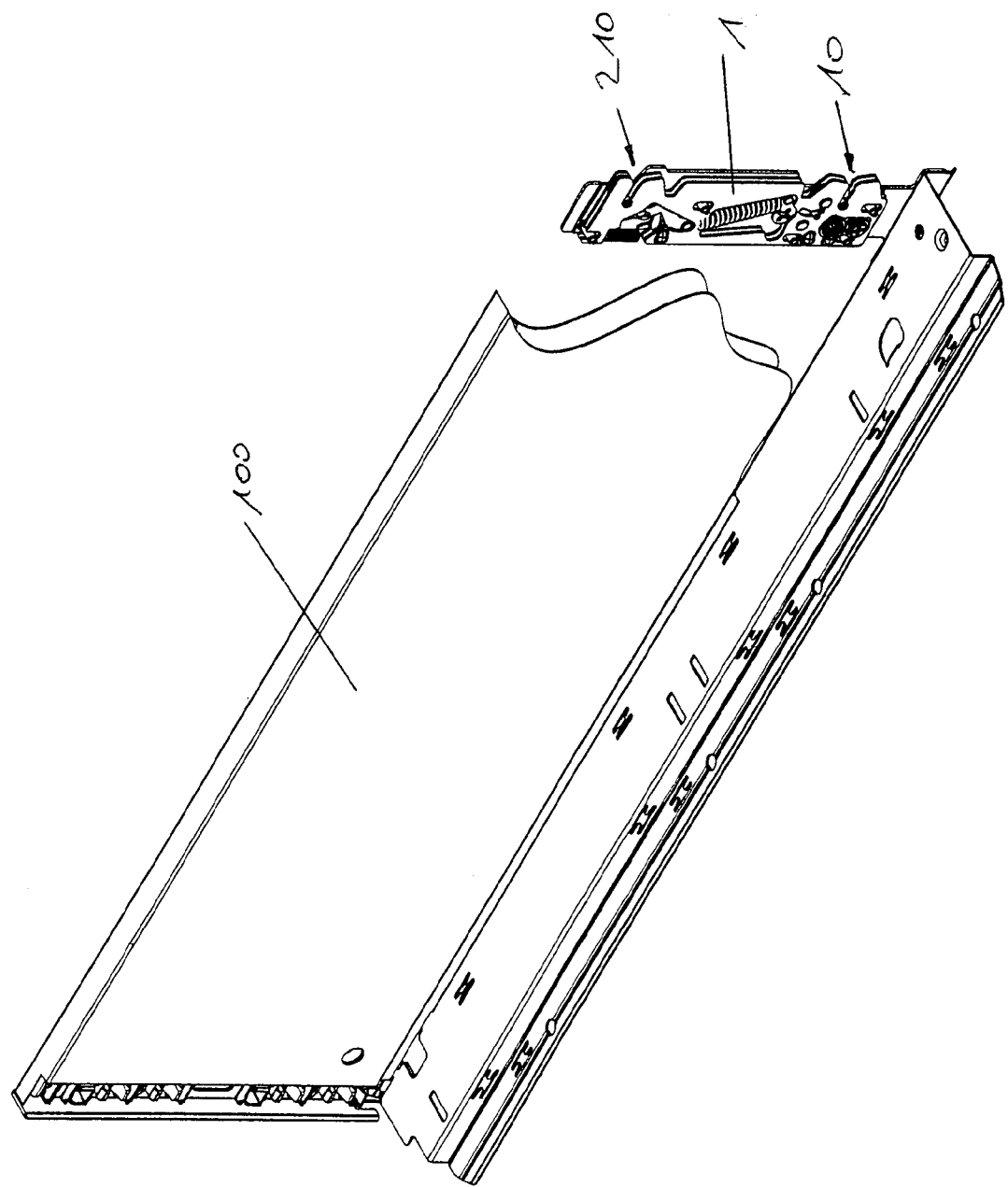

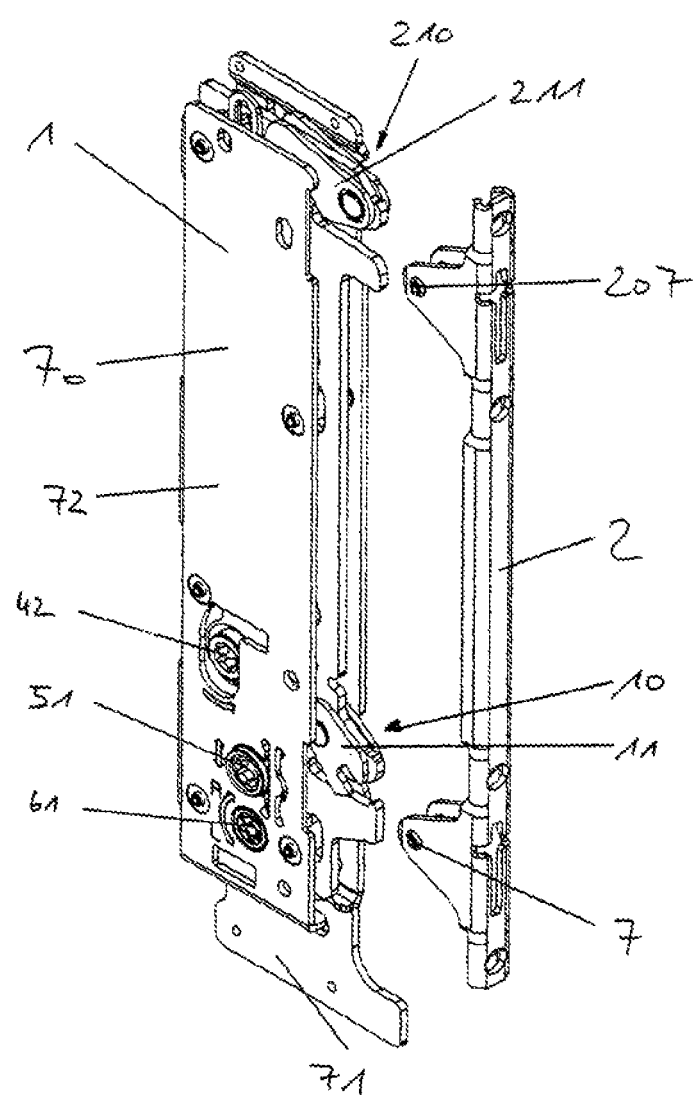

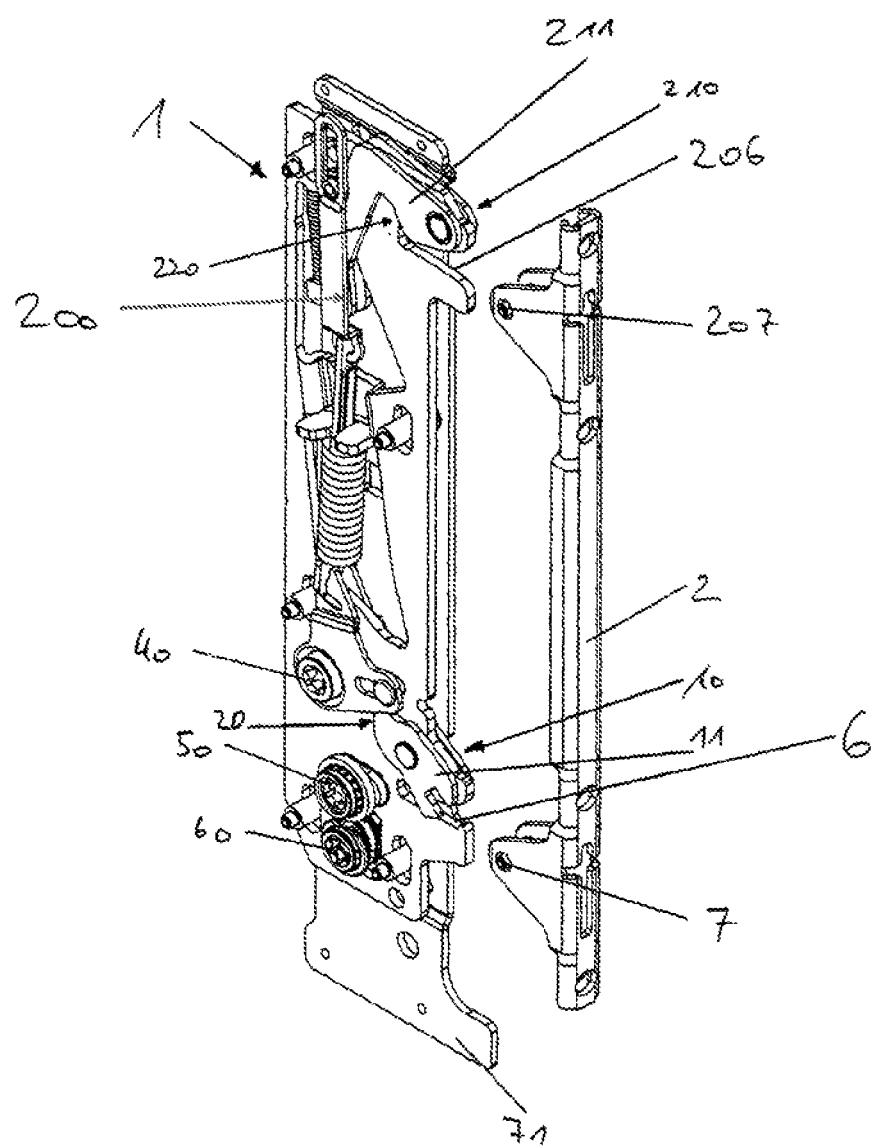

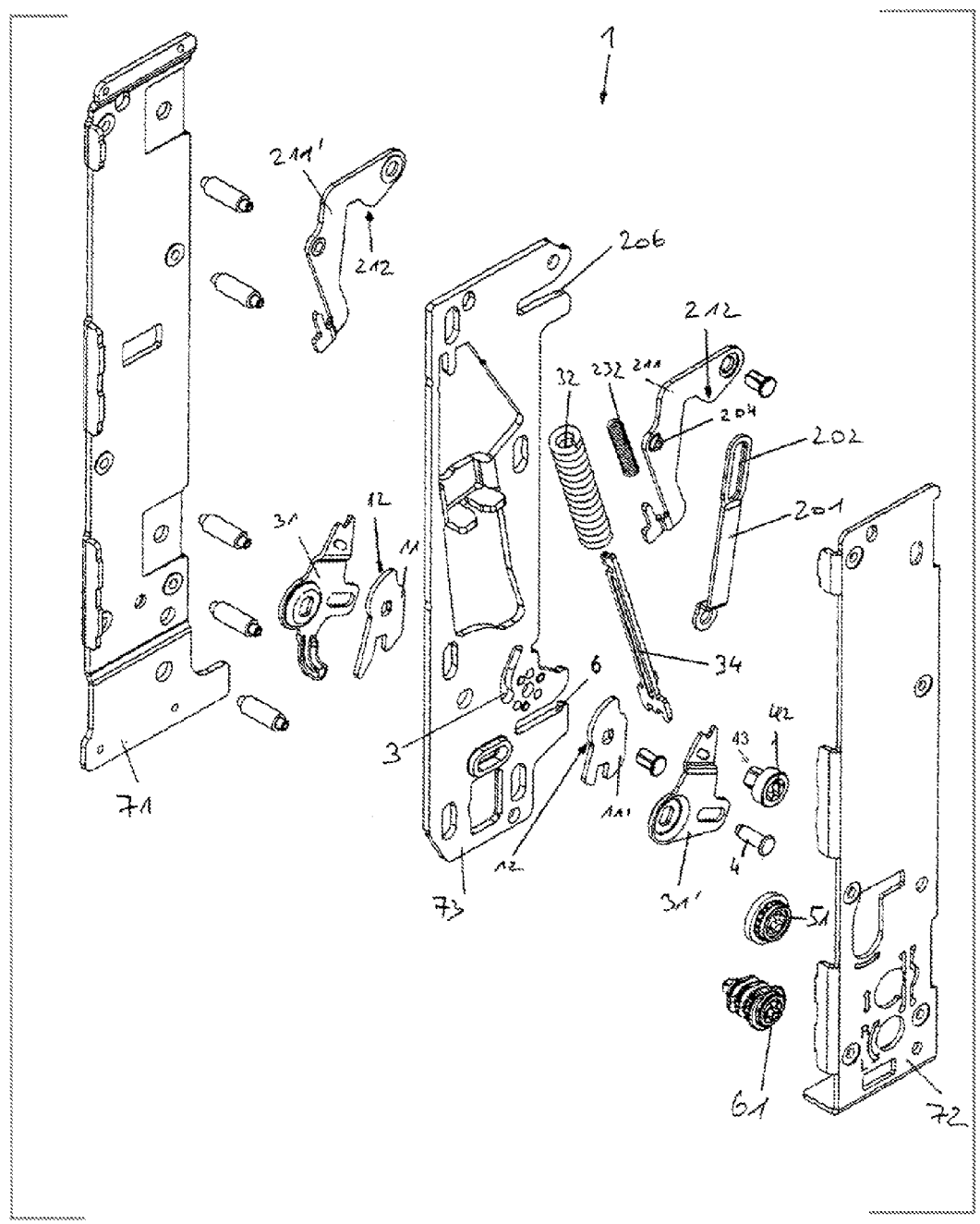

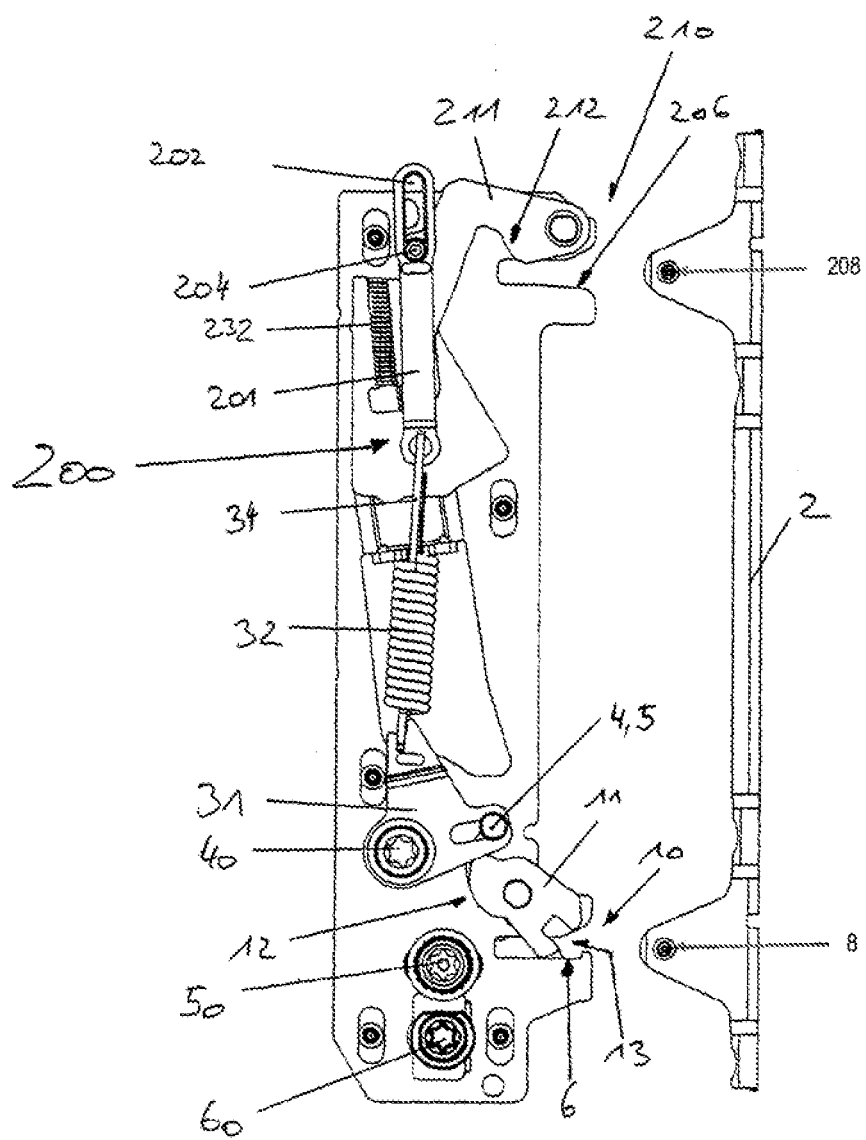

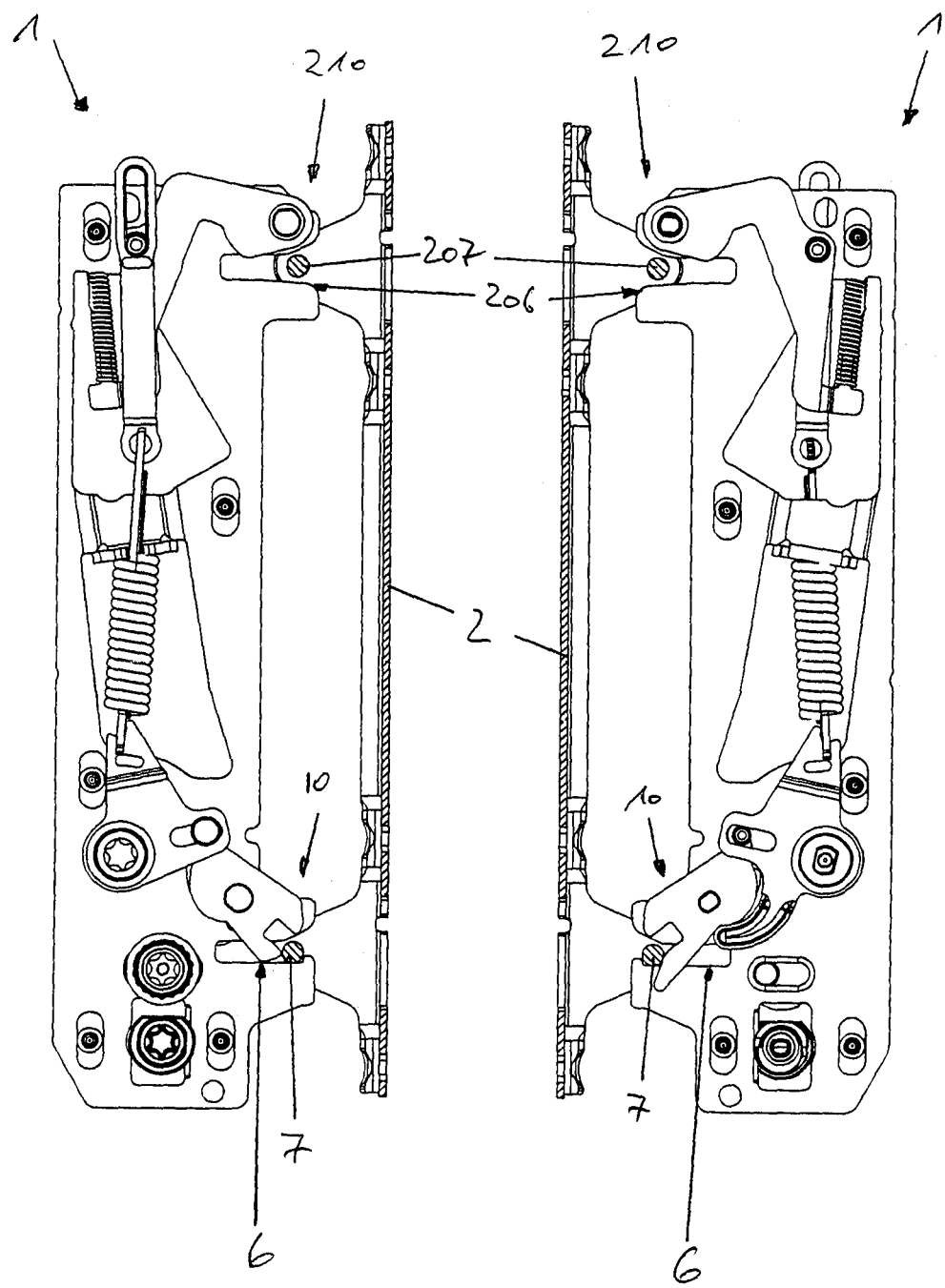

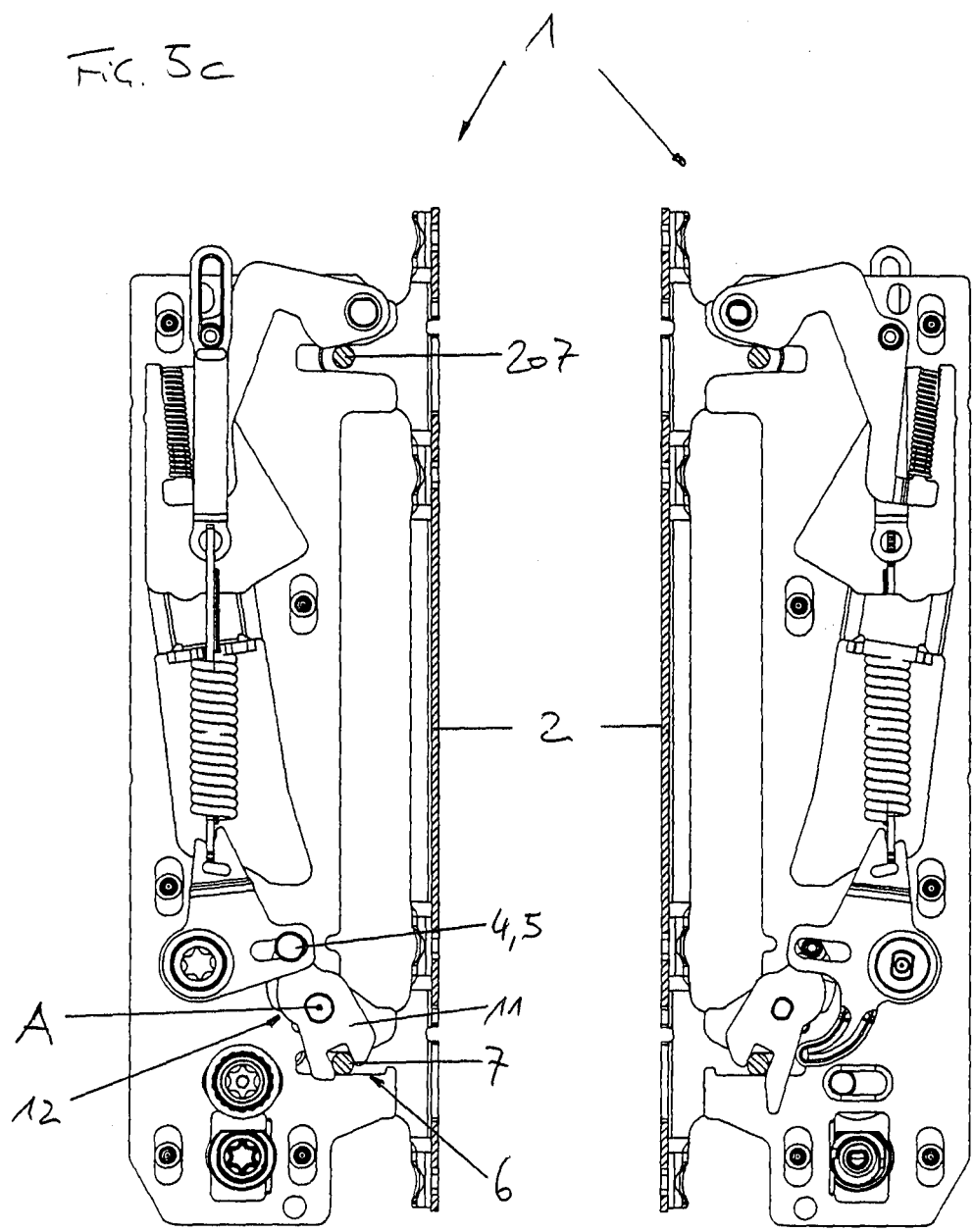

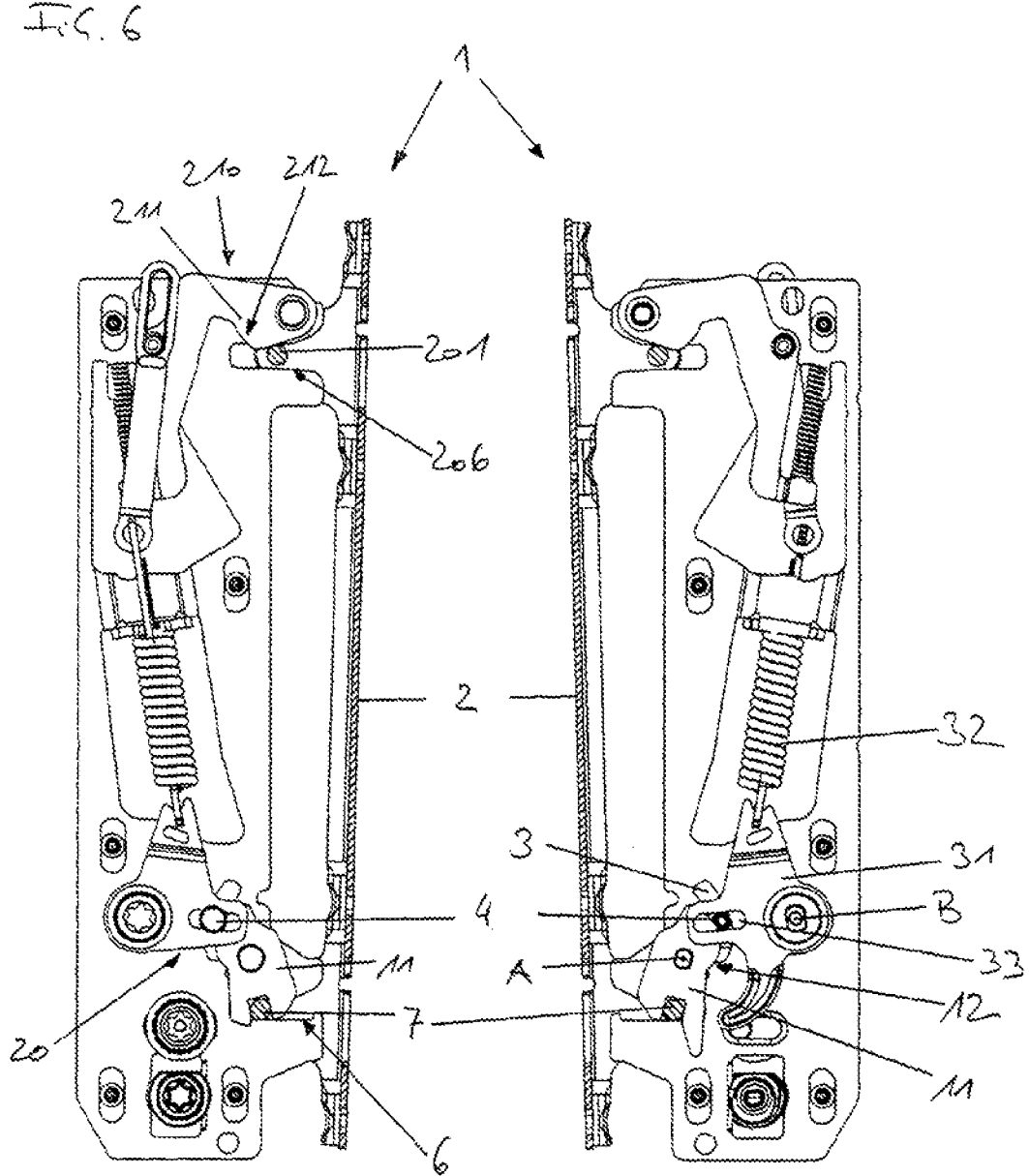

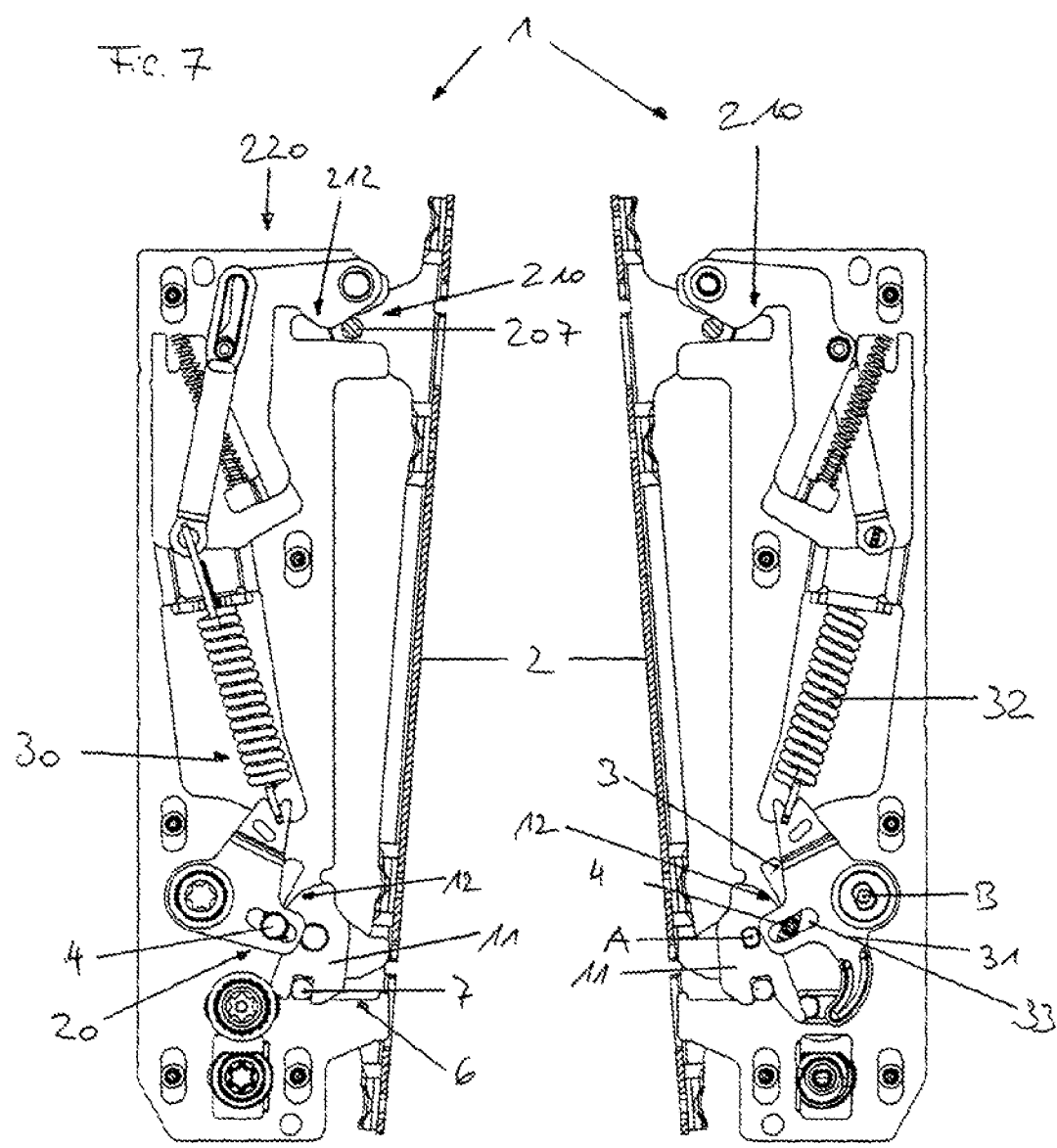

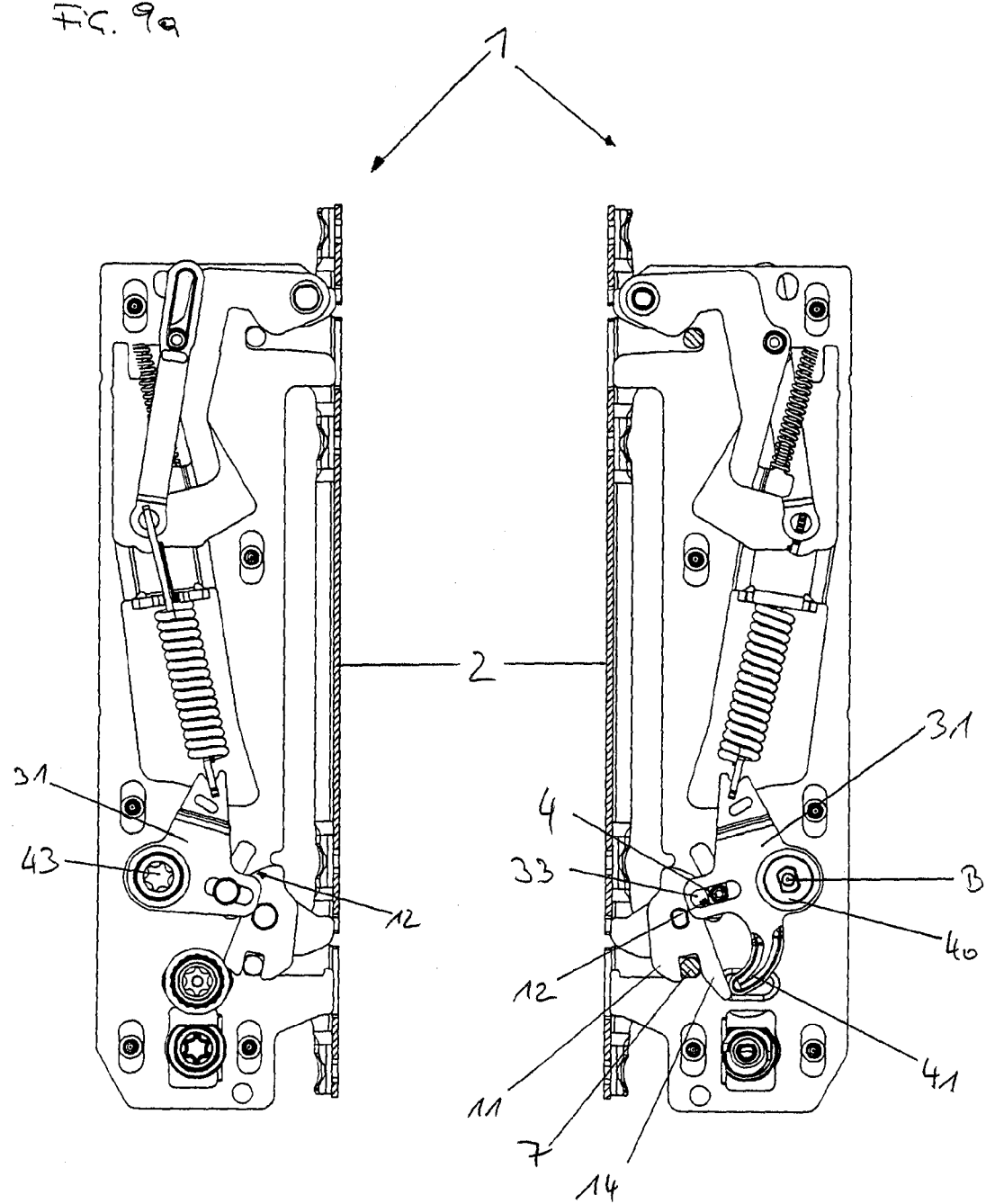

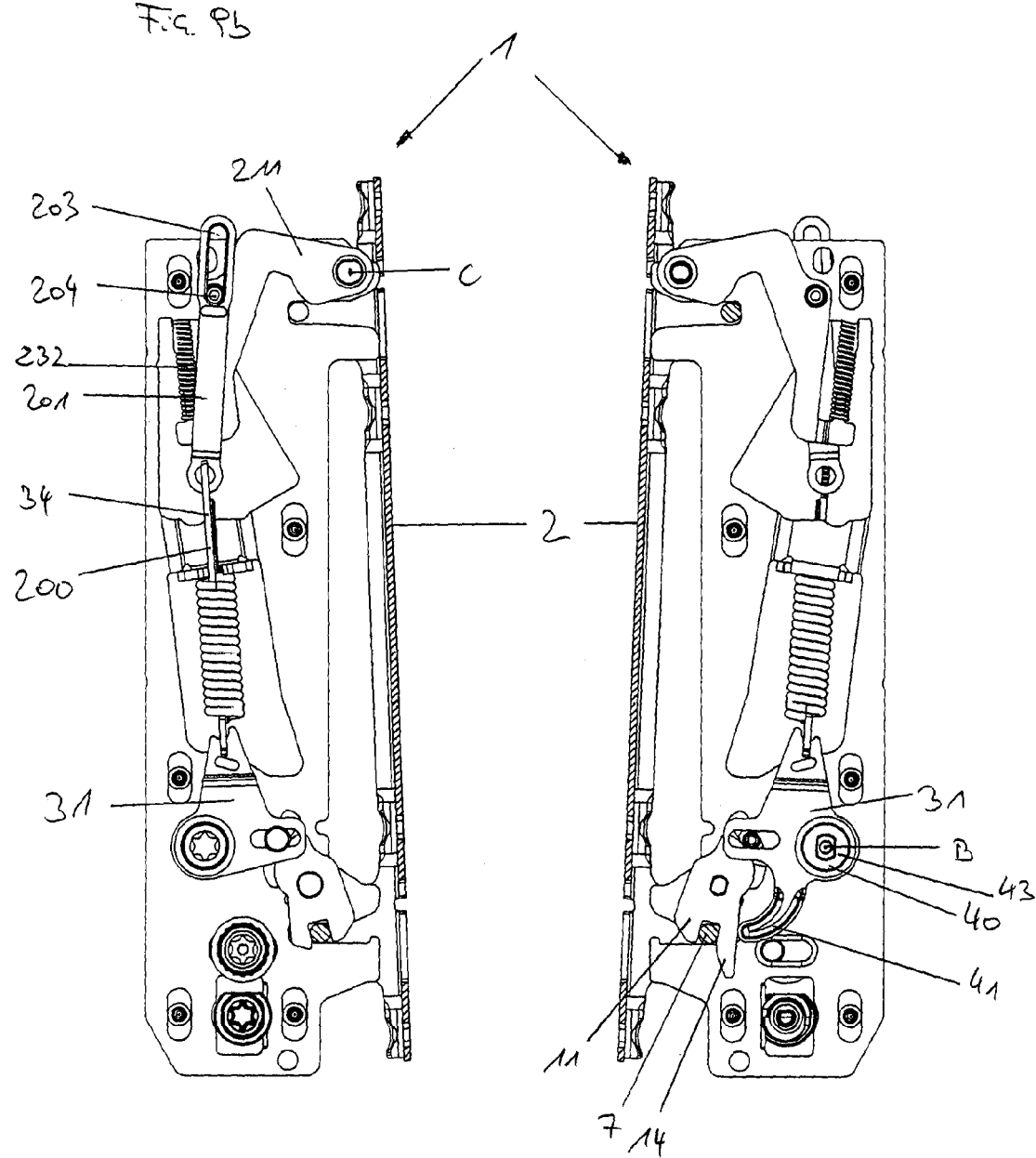

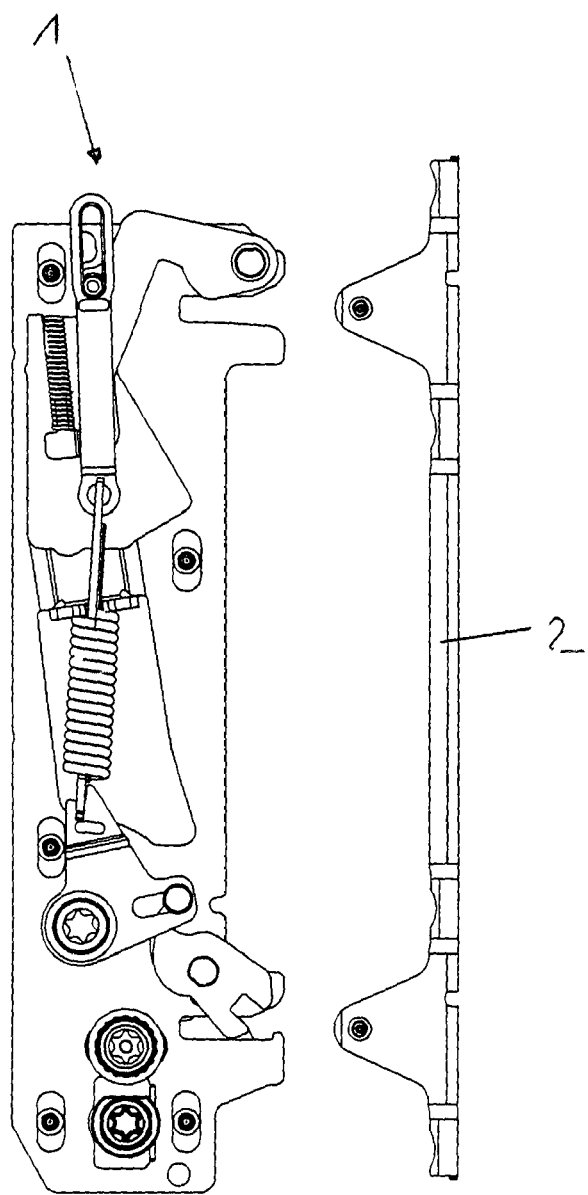

FASTENING DEVICE FOR FASTENING A FRONT PANEL ON A DRAWER

BACKGROUND OF THE INVENTION

1. Field of the Invention

The invention concerns a fastening device for releasably fastening a front panel to a drawer, in particular to a drawer side wall, comprising:

- at least one furniture fitting pre-mounted to the front panel and having a first and a second connecting element for fastening the front panel to the drawer,
- at least two catching devices associated with the drawer, wherein the catching devices automatically hold the connecting elements when being pushed in, wherein the one catching device has at least one moveable catching element and the second catching device has at least one moveable holding element,
- at least one locking device for the two catching devices which prevent unintentional release of the furniture fitting from the catching devices, and
- at least one unlocking device for the two catching devices, wherein the unlocking device permits joint release of the two connecting elements of the furniture fitting from the catching devices.

The invention further concerns a drawer having at least one such fastening device for releasably fixing a front panel to the drawer. The invention also concerns an article of furniture having such a drawer.

2. Background of Related Art

Fastening devices for releasably fastening the front panel to the drawer are already known from the state of the art. An aim in that respect is generally inter alia to provide for rapid fitment of the front panel to the drawer in order to keep down both the assembly times and also the assembly costs.

DE 20 2009 014 811 U1 dated Mar. 25, 2010 discloses a furniture fitting for releasably connecting a first furniture part to a second furniture part, having a receiving element and at least two fastening elements, wherein the receiving element is associated with the first furniture part and the at least two fastening elements are associated with the second furniture part, or vice-versa, and wherein the receiving element has a arresting device for releasably holding the at least two fastening elements, wherein the at least two fastening elements can be jointly arrested in the receiving element, wherein the arresting device of the receiving element has at least two arresting elements which are or can be acted upon by force storage means, preferably a spring, and which are latchable to the fastening elements.

SUMMARY OF THE INVENTION

The object of the invention is to provide a fastening device for releasably fastening a front panel to the drawer, that is improved over the state of the art.

That object is attained by a fastening device having the features of claim 1.

Because the holding element is moveable for locking the second connecting element in the second catching device independently of the catching element of the first catching device, that provides that those two elements do not have to be locked at the same time. In other words for example the catching element can already be arrested, whereas the holding element is not yet.

The effect of this is that the operator who is fitting the front panel to the drawer is not obliged to introduce the two connecting elements of the furniture fitting into the drawer side wall synchronously—as would be the case if the arresting device were to be triggered simultaneously for both catching devices.

Because the two connecting elements can also be introduced one after the other into the fastening device it is possible for the operator to perform the fitment operation more comfortably as he does not have to concentrate on introducing the two connecting devices into the fastening device at the same time.

Because both the holding element and also the catching element are moveable independently of each other both firstly the catching element and then the holding element can moved or also vice-versa. That further provides that this does not necessarily predetermine a sequence as to when which connecting element of the furniture fitting has to be introduced into the fastening device.

Further advantageous embodiments of the invention are defined in the appendant claims.

It has proven to be particularly advantageous if the first catching device is provided in a lower region of the fastening device and the second catching device is provided in an upper region of the fastening device. By virtue of a mutually superposed arrangement of the catching devices they can be for example well fastened in or to a drawer side wall.

According to a preferred embodiment it can be provided that the catching element is mounted pivotably about an axis of rotation and the holding element is mounted pivotably about an axis of rotation. The fact that the catching element and the holding element are mounted pivotably about an axis of rotation means that they can be pivoted during insertion of the connecting elements.

In addition it can preferably be provided that the catching element and the holding element are respectively acted upon by a spring independently of each other. By virtue of a spring-loaded catching element and holding element those elements—after they have been pivoted—can automatically return into their starting position again or it would be necessary to overcome the spring force to be able to release the two elements from an arresting position again.

It has proven to be particularly advantageous if for joint unlocking of the two catching devices a transmission mechanism is provided between the two catching devices. The provision of a transmission mechanism which provides for joint unlocking of the two catching devices means that particularly comfortable unlocking can take place as the two connecting elements do not have to be individually released from the two catching devices but that can be effected with a single release step—by the transmission mechanism.

It can particularly preferably be provided that the transmission mechanism has a lever assembly having a thrust element and a transmission lever moveably coupled to the thrust element. The provision of a lever assembly with thrust element and transmission lever in the transmission mechanism makes it possible to achieve a stable and thus long-lived structure for a transmission mechanism.

In that respect it has proven to be particularly advantageous if the transmission lever of the lever assembly has a path against which a coupling element of the holding element moveably guidedly bears. Moveable contact with respect to the holding element or the coupling element thereof can be achieved by way of a path on the transmission lever. That provides that the holding element can move relative to the transmission lever.

In a preferred embodiment it can be provided that the path is in the form of a guide groove—preferably in the form of an elongate hole. The fact that the path is in the form of a guide groove or an elongate hole can ensure that the coupling element of the holding element can admittedly be displaced relative to the transmission lever, but cannot leave it.

It has further turned out to be advantageous if the at least two connecting elements of the furniture fitting are in the form of holding bolts, wherein a longitudinal extent of the holding bolts extends transversely—preferably at a right angle—to the direction of insertion thereof into the fastening device. Because the holding bolts can be provided transversely—preferably at a right angle—to the direction of insertion into the fastening device, this can provide that only a short depth of insertion of the holding bolts into the fastening device is required, and this can contribute to a compact structure for a fastening device.

It can further preferably be provided that the unlocking device has a tool receiving means for a tool, which tool receiving means is accessible from the exterior and by way of which the unlocking device is actuable. The formation of an externally accessible tool receiving means provides that the unlocking device can be easily actuated.

In accordance with a possible embodiment it can be provided that the fastening device has a height adjusting device and/or a lateral adjusting device for the front panel. The front panel can be adjusted in height relative to the drawer by the provision of a height adjusting device for the fastening device while the front panel can be laterally oriented relative to the drawer by the provision of a lateral adjusting device for the front panel.

Protection is also claimed for a drawer having at least one fastening device for releasably fastening a front panel to the drawer in accordance with at least one of the described embodiments.

Protection is also specifically claimed for an article of furniture having a drawer as described.

BRIEF DESCRIPTION OF THE DRAWINGS

Further details and advantages of the present invention are described more fully hereinafter by means of the specific description with reference to the embodiments by way of example illustrated in the drawings in which:

FIG. 1a shows a perspective front view of an article of furniture with drawers,

FIG. 1b shows a perspective rear view of an article of furniture with drawers,

FIG. 2a shows a perspective view of a drawer side wall with a fastening device and a furniture fitting, FIG. 2b shows a perspective side view of a drawer side wall with a cut-out at the fastening device, FIG. 3a shows a perspective side view of a fastening device in its housing, FIG. 3b shows a perspective side view as in FIG. 3a without housing, FIG. 4 shows a perspective exploded view of a fastening device, FIGS. 5a through 5c show a side view of the fastening device in various stages during insertion and displacement of the lower connecting element into the lower catching device, FIG. 6 shows a side view of the fastening device with the lower connecting element locked and the lower connecting element not completely pushed in, in the lower catching device, FIG. 7 shows a side view of the fastening device with the lower connecting element automatically pulled into the lower catching device, FIG. 8a shows a side view of the fastening device with the lower connecting element locked and pulled in and the upper connecting element pushed in, FIG. 9a shows a side view of the fastening device during activation of unlocking, and FIGS. 9b through 9e show side views of the fastening device with the furniture fitting unlocked and ejected.

DETAILED DESCRIPTION OF ILLUSTRATIVE EMBODIMENTS

Figure 8A:
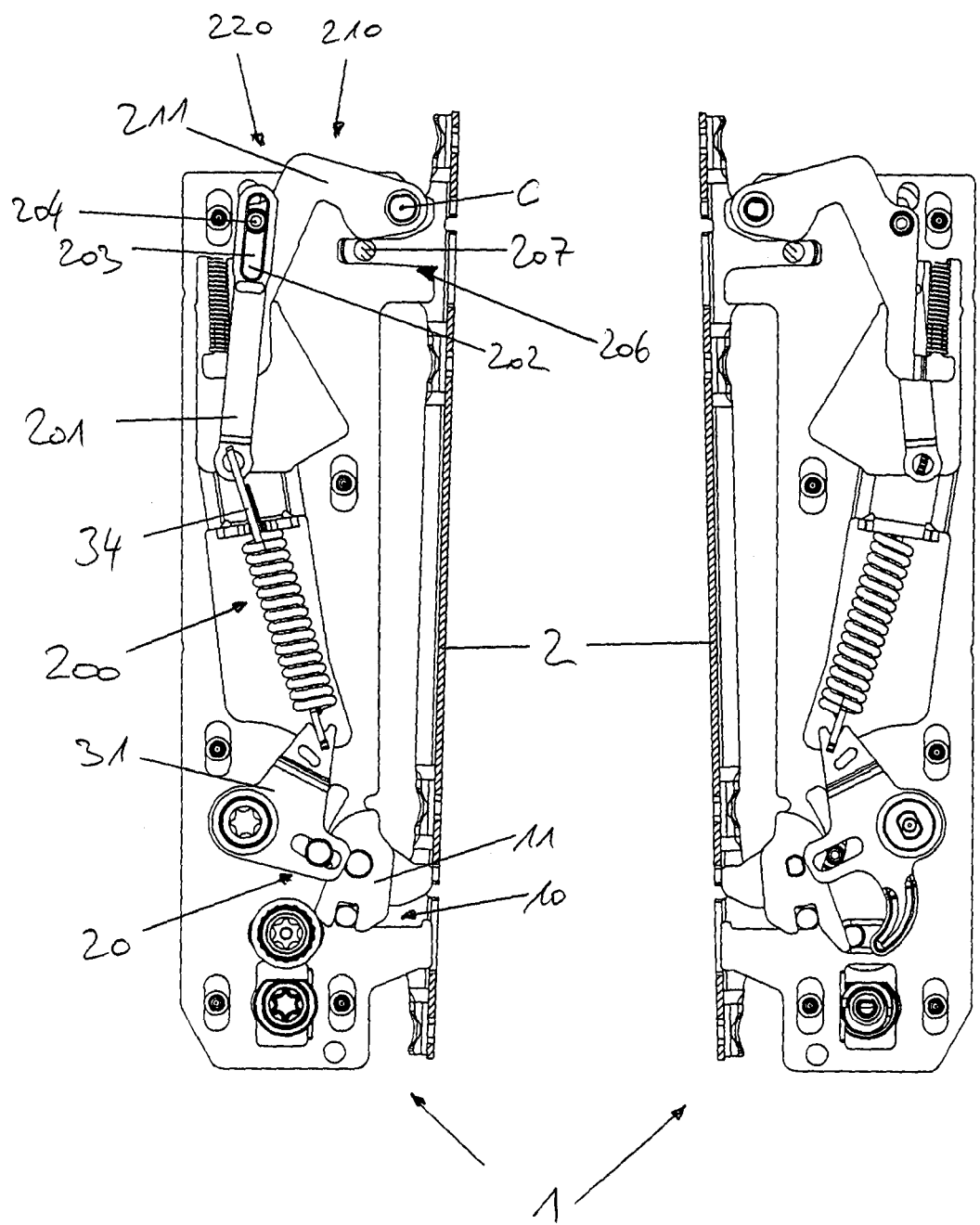

FIG. 1a shows a perspective front side view of an article of furniture 110. The article of furniture 110 has three drawers 102 in a furniture carcass 103. The drawers 102 are mounted moveably on a drawer extension guide 105 in the furniture carcass 103 and each have two drawer side walls 100, a front panel 101 and a drawer rear wall 104. The front panel 101 is fixed to the two side walls 100 of the drawer 102 by way of the fixing devices 1 (not shown here: see FIG. 2b).

FIG. 1b shows a perspective side rear view of an article of furniture 110 with again three drawers 102, as just shown in FIG. 1a. The front panel 101 is not yet fitted to the uppermost drawer 102, for that reason the four furniture fittings 2 can be seen, by way of the connecting elements of which a connection is made to the drawer side walls 100.

FIG. 2a shows a perspective view of a right-hand drawer side wall 100 of an article of furniture 110 (see FIG. 1a or 1b). The fastening device 1 for a front panel 101 (not shown here) is arranged at the front end of the drawer side wall 100 in this preferred embodiment in the drawer side wall 100. The furniture fittings 2 of the front panel 101 (not shown here) are already latched in the fastening device 1.

FIG. 2b shows a drawer side wall 100, as just shown in FIG. 2a. In this view no furniture fitting 2 is fitted in the fastening device 1. In this embodiment the fastening device 1 is arranged in the drawer side wall 100 (see FIG. 2a). In this sectional view in FIG. 2b the fastening device 1 is released from the drawer side wall 100. The two catching devices 10 and 210 can already be clearly seen here.

In the description hereinafter the one catching device 10 is referred to as the lower catching device 10 while in the specific description hereinafter the second catching device 210 is referred to as the upper catching device 210. That serves the purpose of simplicity and clarity of view and does not represent any restriction whatsoever in regard to the positions of the catching devices in the fastening device 1.

FIG. 3a shows a perspective side view of a fastening device 1 and the furniture fitting 2 to be fastened thereto. The fastening device 1 has a housing 70 with a right-hand side cover 71 and a left-hand side cover 72. At the left-hand side cover 72 it is possible to see the adjusting elements for the height adjusting device 50 (see FIG. 3b) (its height adjusting screw 51), for the lateral adjusting device 60 (see FIG. 3b) (its lateral adjusting screw 61) and for the unlocking device 40 (see FIG. 3b) (or its tool receiving means 42).

The lower catching device 10 and its catching element 11 and also the upper catching device 210 and its holding element 211 can also be seen in this view.

FIG. 3b shows a perspective side view of the fastening device 1, as just described with reference to FIG. 3a, without the left-hand side cover 72.

From this view it is possible to see the lower catching device 10 and its catching element 11 which serves to catch the furniture fitting 2 or its connecting element 7 on the feed path 6 and to lock that furniture fitting 2 to the fastening device 1 at the bottom, for which the locking device 20 is provided (see in that respect also the specific description of FIG. 6).

Figure 8B:
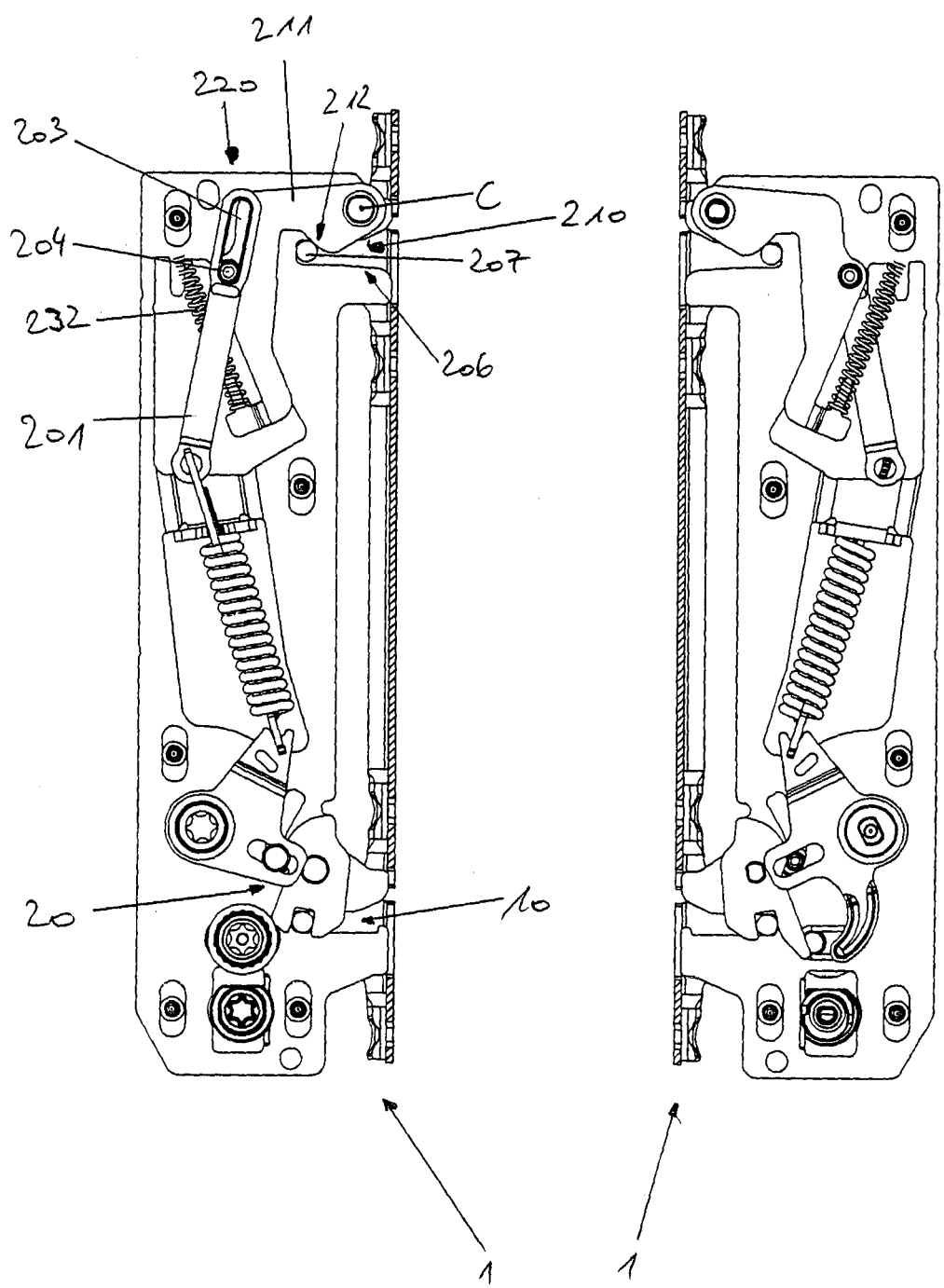
FIG. 8b shows a side view of the fastening device with the lower connecting element locked and pulled in and the upper connecting element locked.

It is also possible to see the upper catching device 210 and its holding element 211 which serves to catch the furniture fitting 2 or its connecting element 207 on the feed path 206 and to lock the furniture fitting 2 to the fastening device 1 at the top, for which the locking device 220 is provided (see in that respect also the specific description of FIGS. 8*a* and 8*b*).

The lower catching device 10 is connected to the upper catching device 210 by way of the transmission mechanism 200, whereby joint unlocking of the two catching devices 10 and 210 is achieved.

FIG. 4 shows a perspective exploded view of the fastening device 1 for the furniture fitting 2 as a side rear view. The right-hand side cover 71 and the left-hand side cover 72 serve as a housing for the fastening device 1. Arranged between those two side covers 71 and 72 is the main plate 73 on which the essential components of the fastening device 1 are arranged. That main plate 73 is adjustable in height relative to the left-hand and right-hand side covers 71 and 72 by the height adjusting screw 51.

In this arrangement the main plate 73 has a guide path 3 in which the control body 4—which in this preferred embodiment is in the form of a loose pressure roller is displaceably mounted. The main plate 73 also has the feed path 6 and 206 for the connecting elements 7 and 207 of the furniture fitting 2 (the connecting elements 7 and 207 of the furniture fitting 2 are not shown here, see for that purpose the specific description of FIG. 5*a*). The connecting elements 7 and 207 of the furniture fitting 2 are introduced into the fastening device 1 along those feed paths 6 and 206.

For stability reasons the components that are essential for functioning—the catching element 11, the holding element 211 and the pivotal lever 31—are each duplicated, wherein a respective one of the components is provided at the left (11, 211', 31) and at the right (11', 211, 31') of the main plate 73.

In this preferred embodiment the control contour 12 is provided on the two catching elements 11 and 11'.

For unlocking purposes the pivotal lever 31 or 31' is actuated by way of the unlocking element 43 which has a tool receiving means 42.

The two pivotal levers 31 and 31' are spring-loaded by way of the spring 32 and its thrust element 34, this being necessary for the pulling-in movement of the furniture fitting 2 (see the specific description of FIG. 7).

The fastening device 1 and thus the front panel 101 (not shown) fastened thereto can be laterally adjusted by way of the lateral adjusting screw 61.

The holding element 211 or 211' has a respective control cam 212, by way of which locking of the connecting element 207 (not shown here) in the fastening device 1 is effected.

In addition provided on the holding element 211 is the coupling element 204 which corresponds to the path 202 of the transmission lever 201.

The two holding elements 211 and 211' are loaded by way of the spring 232.

In this preferred embodiment the path 202 of the transmission lever 201 is in the form of a guide groove more precisely an elongate hole.

Figure 9C:
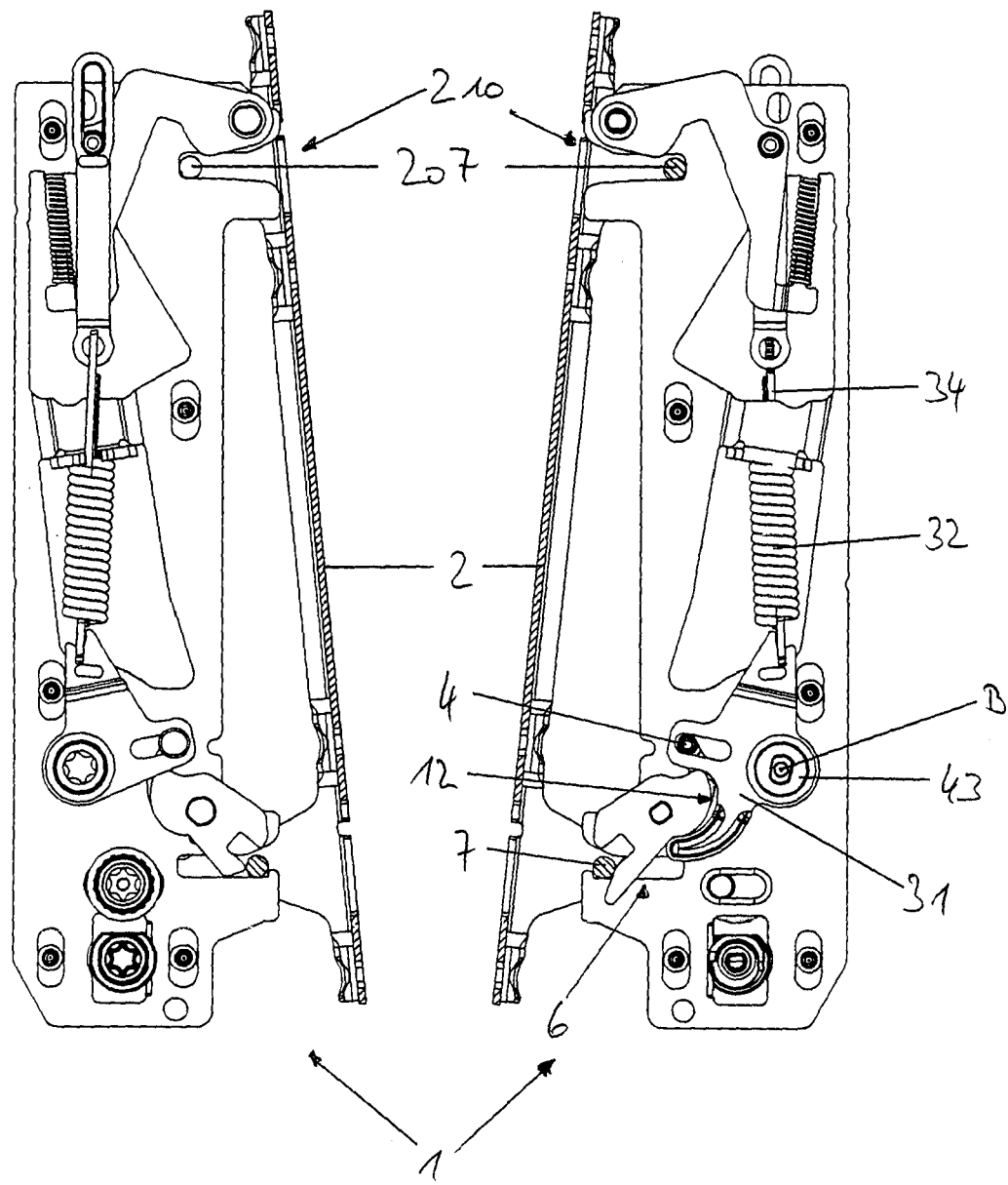
Figure 9D:
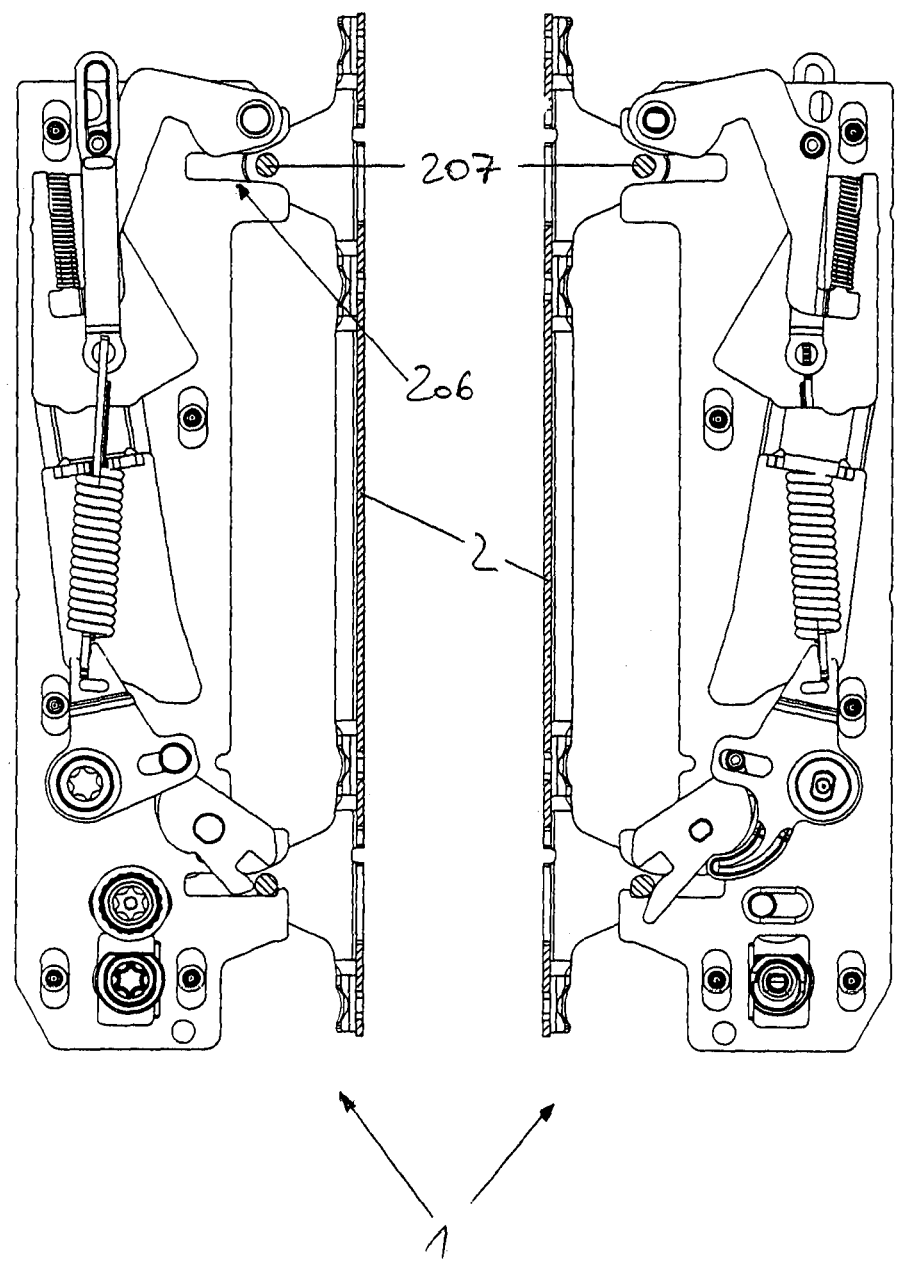

FIGS. 5*a* through 9*e* each show a section through a side view of a fastening device 1 and furniture fitting 2 in various situations. Those situations are:

introduction of the furniture fitting 2 into the fastening device 1 (FIGS. 5*a* through 5*c*), locking of the lower connecting element 7 of the furniture fitting 2 in the lower catching device 10 of the fastening device 1 (FIG. 6), pulling the furniture fitting 2 into the lower catching device 10 of the fastening device 1 (FIG. 7), pushing the upper connecting element 207 of the furniture fitting 2 into the upper catching device 210 of the fastening device 1 (FIG. 8*a*), locking of the upper connecting element 207 of the furniture fitting 2 in the upper catching device 210 of the fastening device 1 (FIG. 8*b*), joint unlocking of the two catching devices 10 and 210 of the furniture fitting 2 in the fastening device 1 (FIGS. 9*a* and 9*b*), and ejection of the furniture fitting 2 from the fastening device 1 (FIGS. 9*c* through 9*e*).

For reasons of clarity not all components of the fastening device 1 are always provided with references in the individual views in FIGS. 5*a* through 9*e*. The components which are crucial for the respective step and the references thereof are however included.

In addition FIGS. 5*b* through 9*d* respectively show a left-hand and a right-hand side view of the fastening device 1 or the furniture fitting 2, the references are not always specified in duplicate, but are only shown there where this was deemed to be appropriate.

As the specific description hereinafter refers to rotary movements as "in the clockwise direction" and " in the counter-clockwise direction" the following references—as concerns the direction of rotation—always relate to the right-hand view in the Figures. It will be appreciated that everything described can be appropriately transferred to the left-hand Figures—by simply reversing the specified direction of rotation.

FIG. 5*a* shows the furniture fitting 2 and its connecting elements 7 and 207 as those are not yet connected to the fastening device 1.

The catching element 11 of the lower catching device 10 is "waiting" with its receiving means 13 at the feed path 6 for the connecting element 7 of the furniture fitting 2. The control body 4 or pressure roller 5 is not or is not yet bearing against the control contour 12 of the catching element 11.

In this preferred embodiment the furniture fitting 2 has both connecting elements 7 and 207. It will be appreciated that it can also be envisaged that there are two furniture fittings 2, in which case each respective furniture fitting 2 has a connecting element 7 and the other furniture fitting 2 has the connecting element 207 and thus the two furniture fittings 2 could be fastened separately with the fastening device 1.

The holding element 211 of the second upper catching device 210 is also "waiting" at the feed path 206 for the connecting element 207 of the furniture fitting 2.

In this preferred embodiment the two connecting elements 7 and 207 of the furniture fitting 2 are in the form of holding bolts 8 and 208 respectively, wherein the longitudinal extent of the two holding bolts 8 and 208 extends transversely—preferably at a right angle—relative to the direction of insertion thereof into the fastening device 1.

The two catching devices 10 and 210 are coupled together by way of the transmission mechanism 200. That coupling however acts only in the unlocking operation but not in the locking operation, as will be explained in greater detail in the views hereinafter. The transmission mechanism 200 substantially comprises the transmission lever 201 which on the one hand corresponds by way of its guide groove 203 to the coupling element 204 of the moveable holding element 211 and on the other hand the transmission lever 201 is hingedly connected to the thrust element 34. The thrust element 34 in turn is coupled to the catching device 10 by way of the pivotal lever 31.

FIG. 5b shows the same situation as FIG. 5a but now the connecting element 7 of the furniture fitting 2 has already been fitted into the feed path 6, but rotation of the catching element 11 has not yet taken place. For that reason the pressure roller 5 has also not yet moved.

The upper connecting element 207 is also already fitted into the feed path 206. Neither the lower connecting element 7 or the upper connecting element 207 are locked to the lower catching device 10 and the upper catching device 210 respectively in that situation.

FIG. 5c shows the fastening device 1 into which the furniture fitting 2 or its connecting element 7 has already been inserted. That insertion movement took place along the feed path 6. In this case the connecting element 7 of the furniture fitting 2 has penetrated into the receiving means of the catching element 11. In this case the catching element 11 is mounted pivotably about its axis of rotation A and insertion of the connecting element 7 thus resulted in a rotational movement of the catching element 11 about the axis of rotation A. In this preferred embodiment the control contour 12 is provided or mounted on the catching element 11.

The control body 4 which in this preferred embodiment is in the form of the pressure roller 5 already bears against the control contour 12 at that moment.

The situation of the upper connecting element 207 of the furniture fitting 2 is unchanged in relation to the situation as depicted in FIG. 5b.

Locking of the catching element 11 and therewith the furniture fitting 2 or its connecting element 7 only takes place in a situation as shown in FIG. 6. The furniture fitting 2 or its connecting element 7 has now been inserted into the fastening device 1 in the feed path 6 to such an extent that the locking device 20 was activated. That was achieved by clamping the pressure roller 5 together with the control contour 12. If the attempt were made to pull the furniture fitting 2 out of the fastening device 1 and thus pivot the catching element 11 in the clockwise direction about the axis of rotation A then the pressure roller 5 would be jammed in the guide path 3 by the control contour 12. The furniture fitting 2 is thus prevented from being pulled out.

On the other hand it is still very well possible for the catching element 11 to be moved in the counter-clockwise direction about the axis of rotation A, which would result in a further downward movement of the control body 4 in the preferably curved guide path 3.

In this respect it should be noted that the pivotal lever 31 and its guide 33 are not necessary for the locking device 20. Locking of the catching element 11 is effected simply and solely by the control contour 12, the guide path 3 and the control body 4. That is possible because the control body 4 would follow the guide path 3 or the control contour 12 solely by virtue of gravity.

It is now possible to also see here a large advantage of that locking device 20. More specifically locking of the furniture fitting 2 is effected on the guide path 6 at any locations in the insertion direction, that is to say locking occurs independently of the depth of insertion of the furniture fitting 2 into the fastening device 1. Even after locking has occurred further insertion of the furniture fitting 2 into the fastening device 1 is possible, that is to say locking is effected only in the pull-out direction but not in the push-in direction. It is therefore possible to achieve different insertion depths, whereby it is also possible to correct tolerances in manufacture in respect of the furniture fitting 2 or the drawer side wall 100 (not shown).

Thus locking already occurs in respect of the lower catching device 10, but not in contrast in respect of the upper catching device 210 in which the connecting element 207 of the furniture fitting 2 was not yet further pushed in on the feed path 206, but that connecting element 207 is still "waiting" at the control cam 212 of the holding element 211 for it to be locked with the upper catching device 210.

This therefore involves time-displaced locking of the two connecting elements 7 and 207 of the furniture fitting 2 in the fastening device 1.

In this preferred embodiment the control body 4 is in the form of a loose pressure roller 5 both in one piece and also of substantially bolt-shaped configuration and made from steel.

The guide path is at least partially of a curved configuration with a—preferably continuously—decreasing radius.

FIG. 7 now shows how the pull-in device 30 becomes operational. After insertion of the furniture fitting 2 or the connecting element 7 into the catching device 10 or its catching element 11 and displacement on the feed path 6, at the moment shown in FIG. 6 the spring 32 is no longer in the dead-center point position with the axis of rotation B of the pivotal lever 31 and thus pivots that pivotal lever 31 in the counter-clockwise direction about the axis of rotation B, as shown in FIG. 7. This means that the pressure roller 5 or the control body 4 is pressed downwardly—along the guide path 3—in the guide 33—which is in the form of an elongate hole—. That downward pressure means that the control body 4 moves downwardly under a spring loading in its guide path 3 and in that case—by virtue of the provision of the control contour 12 on the catching element 11—the catching element 11 is also pivoted in the counter-clockwise direction about its axis of rotation A. In that way the furniture fitting 2 is pulled further into the fastening device 1 by that roller-control contour actuating assembly.

In this position also the lower locking device 20 is again or is always still active as the control body 4 still bears against the control contour 12 and would become jammed thereto if the attempt were made to pivot the catching element 11 in the clockwise direction.

At the upper locking device 220 or the upper catching device 210 the connecting element 207 is still "waiting" at the control cam 212 of the holding element 211 for it to be moved into the upper catching device 210.

Locking of the upper locking device 220 is now shown in FIGS. 8a and 8b. The lower locking device 20 and the lower catching device 10 and also the pivotal lever 31 have no influence on the locking operation of the upper connecting element 207 with the catching device 210.

The connecting element 207 of the furniture fitting 2 is pushed into the fastening device 1 on the feed path 206. In that case the connecting element 207 lifts the holding element 211 by way of the control cam 212 and in so doing pivots the holding element 211 about its axis of rotation C (FIG. 8a), whereby the connecting element 207 can pass behind the control cam 212 of the holding element 211 (see FIG. 8b) and bears locked against the control cam 212.

Lifting of the holding element 211 was made possible by the fact that provided in the transmission lever 201 is a guide groove 203 in which a coupling element 204 of the holding element 211 is displaceably mounted. Without that guide groove 203 which is in the form of an elongate hole the holding element 211 could not be lifted as otherwise there would be a rigid connection between the holding element 211 with the already locked catching element 11 by way of the transmission lever 201, the thrust element 34 and the pivotal lever 31. By virtue of this configuration of the path 202 in the transmission lever 201 of the transmission device 200 the holding element 211 can still move although the lower locking device 20 is already activated but the upper locking device 220 is not yet activated.

FIG. 8b shows how the upper locking device 220 was activated by the connecting element 207 being pushed on the feed path 206 to behind the control cam 212 which is in the form of a nose, whereby on the one hand the coupling element 204 has moved the holding element 211 downwardly again in the guide groove 203 of the transmission lever 201 and on the other hand the locking device 220 was activated by way of the spring 232, whereby the connecting element 207 is prevented from being pulled out of the fastening device 1, thereby preventing unintentional release of the furniture fitting 2 from the upper catching device 211 and from the lower catching device 10.

Thus both locking devices 20 and 220 are now active.

To unlock the fastening device 1 again there is provided the unlocking device 40, the operation of which will now be described with reference to FIG. 9a. Unlocking can be effected manually by way of the unlocking element 43 provided on the pivotal lever 31.

Rotation of the pivotal lever 31 in the clockwise direction about the axis of rotation B provides that the control body 4 in the guide 33 is lifted off the control contour 12 and thus the catching element 11, whereby the catching element 11 is no longer blocked.

To make ejection more user-friendly an ejector 41 is provided on the pivotal lever 31, which—as is already apparent in this view—presses against the unlocking lever 14 of the catching element 11 and thus rotation of the pivotal lever 31 in the clockwise direction leads to rotation of the catching element 11 in the clockwise direction, whereby the connecting element 7 of the furniture fitting 2 is ejected from the fastening device 1, as is shown in FIG. 9b.

By virtue of the rotation of the pivotal lever 31 the coupling element 204 was lifted in the guide groove 203 of the transmission lever 201 by way of the transmission mechanism 200 (pivotal lever 31—thrust element 34—transmission lever 201—coupling element 204—holding element 211) and pivoted about the axis of rotation C of the holding element 211. As a further consequence, lifting of the coupling element 204 resulted in the holding element 211 being lifted, whereby the feed path 206 is cleared and the connecting element 207 can thus be removed from the fastening device 1. At the same time the spring 232 was stressed again by the rotation of the pivotal lever 31 by way of the transmission mechanism 200.

If the operator further rotates the unlocking element 43 in the clockwise direction then—as shown in FIG. 9c—this involves complete ejection of the lower connecting element 7 of the furniture fitting 2 on the feed path 6.

In that position the operator can release the unlocking element 43 again as the spring 32 is disposed with its thrust element 34 in a dead-center point position relative to the axis of rotation B of the pivotal lever and thus the control body 4 and the control contour 12 no longer bear against each other under a spring loading.

The upper connecting element 207 of the furniture fitting 2 could also be removed from the upper catching device 210.

FIG. 9d shows how the upper connecting element 207 of the furniture fitting 2 was also already moved out of the feed path 206.

Thus the furniture fitting 2 can be removed from the fastening device, as shown in FIG. 9e.

LIST OF REFERENCES 1 fastening device
2 furniture fitting
3 guide path
4 control body
5 pressure roller
6 lower feed path
7 lower connecting element
8 lower holding bolt
10 lower catching device
11 catching element
12 control contour
13 receiving means
14 unlocking lever
20 lower locking device
30 pull-in device
31 pivotal lever
32 spring
33 guide (elongate hole)
34 thrust element
40 unlocking device
41 ejector
42 tool receiving means
43 unlocking element
50 height adjusting device
51 height adjusting screw
60 lateral adjusting device
61 lateral adjusting screw
70 housing
71 right-hand side cover
72 left-hand side cover
73 main plate
100 drawer side wall
101 front panel
102 drawer
103 furniture carcass
104 drawer rear wall
105 drawer extension guide
110 article of furniture
200 transmission mechanism
201 transmission lever
202 path
203 guide groove (elongate hole)
204 coupling element
206 upper feed path
207 upper connecting element
208 upper holding bolt
210 upper catching device
211 holding element (moveable)
212 control cam
220 upper locking device
A axis of rotation A of the catching element 11
B axis of rotation B of the pivotal lever 31
C axis of rotation C of the holding element 211

The invention claimed is:

1. A fastening device for releasably fastening a front panel to a drawer, in particular to a drawer side wall, comprising:
    a furniture fitting pre-mounted to the front panel and having a first connecting element and a second connecting element for fastening the front panel to the drawer,
    a first catching device and a second catching device associated with the drawer, wherein the first catching device and the second catching device automatically hold the first connecting element and the second connecting element when being pushed in, wherein the first catching device has a moveable catching element and the second catching device has a moveable holding element, a locking device for the first catching device and the second catching device to prevent unintentional release of the furniture fitting respectively from the first catching device and the second catching device, and an unlocking device for the first catching device and the second catching device, wherein the unlocking device permits joint release of the first connecting element and the second connecting element of the furniture fitting from the first catching device and the second catching device, wherein the moveable holding element is configured to move, lock the second connecting element in the second catching device, and be unlocked from the second connecting element independently of, and uncoupled from, the moveable catching element of the first catching device.

2. The fastening device as set forth in claim 1, wherein the first catching device is provided in a lower region of the fastening device, and the second catching device is provided in an upper region of the fastening device.

3. The fastening device as set forth in claim 1, wherein the moveable catching element is mounted pivotably about an axis of rotation, and the moveable holding element is mounted pivotably about an axis of rotation.

4. The fastening device as set forth in claim 1, wherein the moveable catching element and the moveable holding element are respectively acted upon by spring action independently of each other.

5. The fastening device as set forth in claim 1, further comprising a transmission mechanism between the first catching device and the second catching device to permit joint unlocking of the first catching device and the second catching device.

6. The fastening device as set forth in claim 5, wherein the transmission mechanism has a lever assembly having a thrust element and a transmission lever moveably coupled to the thrust element.

7. The fastening device as set forth in claim 6, wherein the transmission lever of the lever assembly has a path against which a coupling element of the moveable holding element moveably guidedly bears.

8. The fastening device as set forth in claim 7, wherein the path is in a form of a guide groove.

9. The fastening device as set forth in claim 7 wherein the path is in a form of an elongate hole.

10. The fastening device as set forth in claim 1, wherein the first connecting element and the second connecting element of the furniture fitting are in a form of holding bolts, wherein a longitudinal extent of the holding bolts extends transversely to a direction of insertion thereof into the fastening device.

11. The fastening device as set forth in claim 1, wherein the unlocking device has a tool receiving means for receiving a tool, which tool receiving means is accessible from an exterior, and by way of which the unlocking device is actuatable.

12. The fastening device as set forth in claim 1, further comprising a height adjusting device for the front panel.

13. The fastening device as set forth in claim 12, further comprising a lateral adjusting device for the front panel.

14. A drawer having at least one fastening device for releasably fastening a front panel to the drawer as set forth in claim 1.

15. An article of furniture having a drawer as set forth in claim 14.

16. The fastening device as set forth in claim 1, further comprising a lateral adjusting device for the front panel.

17. The fastening device as set forth in claim 1, wherein the first connecting element and the second connecting element of the furniture fitting are in a form of holding bolts, wherein a longitudinal extent of the holding bolts extends at a right angle to a direction of insertion thereof into the fastening device.

\* \* \* \* \*